United States Patent [19]

Sawko

[11] 4,209,561
[45] Jun. 24, 1980

[54] STRUCTURAL WOOD PANELS WITH IMPROVED FIRE RESISTANCE

[75] Inventor: Paul M. Sawko, San Jose, Calif.

[73] Assignee: The United States of America as represented by the Administrator of the National Aeronautics and Space Administration, Washington, D.C.

[21] Appl. No.: 929,086

[22] Filed: Jul. 28, 1978

[51] Int. Cl.$^2$ .............................................. B32B 5/12
[52] U.S. Cl. .................................. 428/114; 260/17.2; 428/528; 428/541; 428/921
[58] Field of Search ............... 428/528, 921, 541, 114; 260/17.2

[56] References Cited

U.S. PATENT DOCUMENTS

| 3,164,511 | 1/1965 | Elmendorf | 428/110 |
|---|---|---|---|
| 3,576,788 | 4/1971 | Harris et al. | 528/210 |
| 3,632,555 | 1/1972 | Harris et al. | 528/95 |
| 3,811,992 | 5/1974 | Handa et al. | 428/447 |

*Primary Examiner*—George F. Lesmes
*Assistant Examiner*—E. Rollins Buffalow
*Attorney, Agent, or Firm*—Armand McMillan; John R. Manning; Darrell G. Brekke

[57] ABSTRACT

Structural wood paneling or other molded wood compositions consisting of finely divided wood chips, flour, or strands are bound together and hot pressed with a modified novolac resin which is the cured product of a prepolymer made from an aralkyl ether or halide with a phenol and a hardening agent such as hexamethylene tetramine. The fire resistance of these articles is further improved by incorporating in the binder certain inorganic fillers, especially a mixture of ammonium oxalate and ammonium phosphate.

7 Claims, No Drawings

STRUCTURAL WOOD PANELS WITH IMPROVED FIRE RESISTANCE

BACKGROUND OF THE INVENTION

1. Field of the Invention

The present invention relates generally to structural wood panels and other molded products composed of cellulosic particles held together by an organic resin binder. More particularly, it relates to the selection of resin and other additives that will confer on such products enhanced resistance to fire.

2. Description of the Prior Art

The manufacture of wooden panels and other cellulosic articles from particles bonded together by a resin is well established in the art and encompasses products ranging from panels made of oriented wood strands embedded in a novolac type resin (U.S. Pat. Nos. 3,164,511; 3,202,743; and 3,478,861) to articles made from cellulosic particles such as wood flour molded with a thermosetting resin into useful shapes such as cups, trays, and plates. In the latter process, it has been found advantageous at times to replace the resin with about 1 to 2% by weight of the salt of a weak acid, e.g., ammonium oxalate, in order to avoid recourse to temperatures higher than 200° C. during the molding process.

Another aspect of the prior art has been to provide these compounded cellulosic structures, including plywood panels, with increased fire resistance so that they can better serve the building industry. Of the numerous approaches used to achieve this goal, suffice it to mention here a few illustrative processes such as the impregnation of fire retarding substances into combustible paneling, the applications of a fire resistant coating on a surface to be protected, the use of specially treated binders, and the like. Thus, plywood structures have been treated with mixtures of sodium silicate, ammonium sulfate, urea, and other compounds, for fireproofing purposes (U.S. Pat. No. 3,811,992). Wooden panels have been protected by applying to them various layers of water soluble and water insoluble silicates (U.S. Pat. No. 3,663,355). Others have approached the problem of flame-retardance in fibrous sheet material such as textiles, by distributing the retarding agent, e.g., diammonium phosphate, in a pattern of varying concentration along the surface of the sheet (U.S. Pat. No. 3,767,452).

In the present instance, the objective has been the development of a method which would impart greatly improved fire resistance to conventional composites based on cellulosic substances. Another object has been to identify materials and combination of materials which could render such a method possible. A further object has been to upgrade the fire resistance of conventional wooden paneling sufficiently so that its use may be extended to areas from which it is now kept because of its flammability.

SUMMARY OF THE INVENTION

It has now been discovered that the flame spread resistance and the burn-through time of panels or other articles composed primarily of cellulosic particles, can be dramatically improved by employing as a binder for all or part of said particles a thermosetting resin which is the cured product of a prepolymer formed by the reaction of an aralkyl ether or an aralkyl halide with a molar excess of a phenolic compound. The crosslinking of such a resin after application to the cellulosic particles is accomplished by heating the composition with, for example, hexamethylene diamine.

The burn-through time of the panels can be further decreased by incorporating certain ammonium salts, the best results being achieved with a mixture of ammonium phosphate and ammonium oxalate.

DETAILED DESCRIPTION OF THE INVENTION

The present invention is concerned with articles or panels conventionally made from lignocellulosic particles blended with a thermosetting resin and then shaped and cured by the application of heat. Pressure is often employed to help these processes. The lignocellulosic particles that are used to manufacture these products can vary in shape and size, and include such species as wood flour, sawdust, chips, and fibers. The present description should deal essentially with oriented particle board, leaving to the man skilled in the art the task of substituting such other wood particles and such less specialized processing as may be desired for the purpose at hand.

Current state-of-the-art oriented particle boards are made from strands of wood sprayed with a water base phenolic solution and then oriented in a preferred direction to upgrade mechanical properties. The phenolic novolac type resin ultimately constitutes from 3 to 6% of the total panel weight. The procedures, methods, and apparatus employed to construct such panels are described in the following patents: U.S. Pat. No. 3,164,511—oriented strand board; U.S. Pat. No. 3,478,861—orienting wood strands; and U.S. Pat. No. 3,202,743—method of forming a composite panel. Structural particle boards, like most pressed wood articles, are afflicted with poor fire resistance, a shortcoming which can be partly alleviated by elaborate surface treatment, impregnation, or addition of cementitious materials. Lack of resistance to direct flame, conventionally expressed as flame spread number, greatly limits the use of such boards, in that to qualify for construction use, a flame spread number within Class II (26-75 range) is required. The flame spread number of the board of the art is greater than 200. As to the addition of common inorganic fire retarding salts, it is known that environment effects such as high humidity can cause the leaching of such salts to the detriment of the fire resistance properties.

Process for Manufacturing Oriented Strand Boards

The process for manufacturing the oriented strand boards that have been used in the examples of this specification can be summarized as follows, further details being provided in the patents listed earlier:

(1) the raw wood (round wood or residues) is flaked to the desired size, i.e., about 40 mm × 40 mm × 0.4 mm;

(2) the flakes are split in a hammermill to strands, size about 6 mm × 40 mm × 0.4 mm;

(3) the strands are dried to a moisture content of 4 to 5%.

(4) a water-based adhesive is applied to the strands, as a binder;

(5) the strands are air-filtered and aligned as specified in each layer—layer thickness may be varied;

(6) the successive layers are laid down with alignment 90° apart to form a mat—the number of layers may be varied;

(7) a mat of several layers is prepressed;

(8) the mat is formed into a panel of desired thickness or density on a hot press, with simultaneous heat curing of the adhesive;

(9) the panel is removed from the press to an air cooler and then to a trimming station; and

(10) the trimmed panel is passed to a finishing station for sounding, painting, etc.

The examples that follow show the beneficial effect of substituting, in step 4 of the procedure, certain aralkyl etherphenol polymers for the conventional phenolic novolac resin binder generally employed. Also, the advantages of employing certain inorganic fillers with the resins are demonstrated.

Prior to application, the resin and inorganic filler selected are dissolved and suspended in a carrier liquid at a viscosity which permits spraying onto the wood strands. During this spraying process, the strands are fluffed continuously in a blender consisting of, for instance, a slowly revolving drum equipped with a more rapidly revolving inner rotor. The nature and quantity of binder and inorganic filler that are applied may vary in the different layers of strands that ultimately constitute a panel. However, when inorganic fillers are used, they are preferably placed in the layers at the surface of the panel. Such materials are preferably incorporated at a level of up to about 25% of the total weight of the composite.

The resins that are used as binders in the practice of the present invention are novolac type polymers prepared by the reaction of an aralkyl ether of the general formula $R'[-(CH_2OR)]_a$ and/or an aralkyl halide of the general formula $R''[-(CH_2X)]_a$ with an excess of a phenolic compound or a phenolic compound and a compound containing aromatic nuclei. In the above formulas, $R'$ is a divalent or trivalent aromatic hydrocarbon or hydrocarbonoxy radical; $R''$ is a divalent or trivalent aromatic hydrocarbon radical, $R'$ and $R''$ optionally containing inert substituents in the aromatic nucleus; R is an alkyl radical containing less than six carbon atoms; X is chlorine, bromine, or iodine; and (a) has a value of 2 or 3. As phenolic compound, there may be used any compound or mixture of compounds derived from benzene and containing from one to three, preferably one or two, hydroxyl radicals attached to the aromatic nucleus, there being not more than three substituents attached to carbon atoms in the benzene nucleus. Specific compounds fitting the above descriptions include p-xylylene glycol, p-xylyleneglycoldimethylether, phenol, p-cresol, resorcinol, cathecol, and the like.

The reaction between the aralkyl compound and the phenol to form a prepolymer is preferably carried out in the presence of a Friedel-Crafts type catalyst, stannic chloride being most preferred. The prepolymer is then cured by heating to a temperature between 100° and 200° C. or higher, using a hardening agent such as hexamethylene tetramine.

Further details about the usable modified novolac resins have been disclosed in several patents, including U.S. Pat. Nos. 3,576,788; 3,755,210; and 3,632,555 which are hereby incorporated by reference into the present specification.

The resins just described are used at a level of about 10 to 33%, preferably 10 to 20%, based on the total weight of the composites.

The following examples will now serve to illustrate the practice of the present invention by describing, inter alia, its preferred embodiment.

EXAMPLE 1 to 5

A series of oriented wood structural panels were prepared according to the conventional process described above, except that changes were made in the resin binders employed and, as indicated in the various examples, certain inorganic fillers and combinations thereof were employed in some of the embodiments. The compositions, pressing parameters, physical measurements, and fire properties of the test panels are summarized in the following table. All other factors involved in the fabrication of said panels are identical, and therefore not listed here.

| | | Panels and Properties | | | | | | |
|---|---|---|---|---|---|---|---|---|
| | | Hot Pressing | | Physical Data | | | Burn-through | Flame |
| Ex | Materials[a] | Time (min.) | Temp. (°C.) | Thickness (mm) | Weight (Kg/m$^2$) | Spec. Gravity | Time (sec) | Spread Index |
| 1 | 625g Wood Strands[b] 150g phenolic resin[c] 50g water | 10 | 165 | 9.72 | 5.86 | 0.60 | 287 | >200 |
| 2 | 700g Wood Strands 145g Xylok resin[d] 50g isopropanol | 75 | 174 | 9.72 | 6.54 | 0.67 | 422 | — |
| 3 | As in Ex. 2 +29g NH$_4$ oxalate[e] | 75 | 174 | 9.72 | — | — | 464 | >200 |
| 4 | As in Ex. 2 +30g NH$_4$ phosphate[e] | 75 | 174 | 9.72 | — | — | — | 70 |
| 5 | 175g Wood Strands 109g Xylok resin 38g isopropanol + (added to one surface layer) 36g Xylok resin, 40g isopropanol, 42g NH$_4$ oxalate, and 42g NH$_4$ phosphate[f] | 75 | 174 | 10.06 | 6.95 | 0.69 | 588 | 60 |

[a]Mixtures of materials spread in three layers of oriented strands and formed into 337 mm × 337 mm panels.
[b]Douglas fir strands
[c]Standard commercial novolac resin, 50% solids (Borden Chemical Co.)
[d]Prepolymer of p-cresol with 1,4-dimethoxymethylbenzene, mixed with hexamethylene tetramine, as in Example 1of patent 3,576,788.
[e]Ammonium salt present throughout panel.
[f]Ammonium salts in top surface layer only The burn-through tests were conducted in the NASA T-3 Fire Test Facility in which a sample can be exposed to a controlled heat flux having both a radiant heat component and a conductive heat component. The test has been described in detail in the Journal of Fire and Flammability, Volume 6, pages 205 to 221 (April 1975).

As can be seen from the table, a striking improvement in burn-through time occurs with the replacement of the state-of-the-art novolac resin (Ex. 1) with the aralkyl ether-phenol type binder (Ex. 2, 3, and 5). An even more dramatic improvement can be observed when certain fillers are introduced either throughout the entire panel or into the layer of strands directly exposed to the heat flux (Ex. 3 and 5).

The flame spread data has been obtained using a two-foot tunnel test devised for screening materials. The test has been described in the Journal of Paint Technology, Volume 39, No. 511, pages 494–500 (August 1967) under the title, "Use of a Small Tunnel for Evaluating Fire Hazards". As evidenced by the results in the table, the incorporation of certain fillers or combination of fillers into the resin binder and ultimately into the panels, sufficiently lowers the flame spread index (Ex. 4 and 5) to change the classification of cellulosic panels from Class III to Class II (Uniform Building Code, 1976 Edition, Part VIII, Chapter 42, pp. 548–551) and thus greatly increases their utility in the construction trade.

EXAMPLE 6

A panel prepared as in Example 5 was exposed to 90% relative humidity at 38° C. for 30 days. Its burn-through time and flame spread index were 575 seconds and 55, respectively. These values indicate that no deterioration occurred under such conditions.

EXAMPLE 7

A panel made as in Example 2 but with Eastern white cedar strands instead of Douglas fir strands yielded essentially identical values for burn-through time and flame spread index.

Finally, it was discovered that the inclusion of some common inorganic fillers, specifically zinc borate and sodium silicate, did not cause any improvement in burn-through time and in flame spread index even when compounded with aralkyletherphenol resin as in Example 2. The performance of panels made with such fillers was not any better than the conventional panel of Example 1.

What is claimed is:

1. Flame-resistant cellulosic composite which comprises finely divided wood particles bound together by about 10 to 33% on a weight basis, of a cured thermosetting resin made from a prepolymer prepared by the reaction of (1) an aralkylether of the general formula $R'[-(CH_2OR)]_a$, wherein $R'$ is selected from the group consisting of divalent aromatic hydrocarbon radicals, trivalent aromatic hydrocarbonoxy radicals, $R$ is an alkyl radical containing less than 6 carbon atoms, and $a$ is equal to 2 or 3; with a molar excess of (2) a phenolic compound containing from 1 to 3 hydroxyl groups.

2. The composite of claim 1 wherein the wood particles are in the form of oriented strands.

3. The composite of claim 1 wherein the alkarylether is 1,4-dimethoxymethylbenzene and the prepolymer is cured by reaction with hexamethylenetetramine.

4. The composite of claim 3 wherein the resin constitutes between about 10 and 20% of the total composite weight.

5. The composite of claim 1 wherein the prepolymer has been mixed with an inorganic material selected from the class consisting of ammonium oxalate, ammonium phosphate, and mixtures thereof, said material constituting up to about 25% of the total composite weight.

6. The composite of claim 5 wherein the inorganic material is confined within a layer of particles located at a surface of said composite.

7. The composite of claim 5 or 6 wherein the inorganic material used consists of equal weights of ammonium oxalate and ammonium phosphate.

* * * * *